US011714419B2

(12) United States Patent
Toyota et al.

(10) Patent No.: US 11,714,419 B2
(45) Date of Patent: Aug. 1, 2023

(54) AUTOMATIC ARTICLE CONVEYING SYSTEM AND AUTOMATIC ARTICLE CONVEYING METHOD

(71) Applicant: Hitachi, Ltd., Tokyo (JP)

(72) Inventors: Yoshiaki Toyota, Tokyo (JP); Takahiro Odaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 270 days.

(21) Appl. No.: 17/345,662

(22) Filed: Jun. 11, 2021

(65) Prior Publication Data

US 2022/0004195 A1 Jan. 6, 2022

(30) Foreign Application Priority Data

Jul. 2, 2020 (JP) .................. 2020-114890

(51) Int. Cl.
*G05D 1/02* (2020.01)
*G06Q 10/087* (2023.01)

(52) U.S. Cl.
CPC ......... *G05D 1/0217* (2013.01); *G05D 1/0287* (2013.01); *G06Q 10/087* (2013.01); *G05D 2201/0216* (2013.01)

(58) Field of Classification Search
CPC .. G05D 1/0214; G05D 1/0088; G05D 1/0238; G05D 1/0246; G05D 1/0274
See application file for complete search history.

(56) References Cited

U.S. PATENT DOCUMENTS 9,786,187 B1 10/2017 Bar-Zeev et al.
10,239,378 B2 * 3/2019 Liivik .................. G05D 1/0238
(Continued)

FOREIGN PATENT DOCUMENTS

| JP | 2020-1868 A | 1/2020 |
| JP | 2020-21351 A | 2/2020 |
| JP | 2020-33154 A | 3/2020 |

*Primary Examiner* — Ramsey Refai
(74) *Attorney, Agent, or Firm* — Crowell & Moring LLP

(57) ABSTRACT

Provided is an automatic conveying technique capable of reducing load on a management system and promptly formulating and reviewing an operation plan. One preferred aspect of the invention includes: a plurality of conveying vehicles including a first conveying vehicle and a second conveying vehicle; and a management system configured to control the plurality of conveying vehicles. The management system is configured to formulate, for the plurality of conveying vehicles, an operation plan to be executed in a plurality of conveying operations collectively performed by the plurality of conveying vehicles. The management system is configured to determine by calculation that the first conveying vehicle is to perform a first conveying operation among the plurality of conveying operations, notify the other conveying vehicles including the second conveying vehicle of the first conveying operation, and cause the first conveying vehicle to perform the first conveying operation. The management system is configured to determine by calculation a second conveying operation to be performed by the second conveying vehicle among conveying operations that are not to be performed by the other conveying vehicles including the first conveying vehicle among the plurality of conveying operations, notify the other conveying vehicles of the second conveying operation, and cause the second conveying vehicle to perform the second conveying operation. The second conveying operation is calculated such that the plurality of conveying operations collectively performed by the plurality of conveying vehicles have a higher conveying efficiency.

10 Claims, 7 Drawing Sheets

(56) References Cited

U.S. PATENT DOCUMENTS

| | | | |
|---|---|---|---|
| 10,248,120 B1* | 4/2019 | Siegel | G05D 1/0088 |
| 2008/0167884 A1* | 7/2008 | Mountz | G06Q 10/0833 |
| | | | 705/29 |
| 2009/0185884 A1* | 7/2009 | Wurman | G06F 7/00 |
| | | | 700/215 |
| 2016/0229631 A1* | 8/2016 | Kimura | G06Q 10/08 |
| 2016/0355338 A1* | 12/2016 | Kazama | B65G 1/1378 |
| 2020/0231383 A1 | 7/2020 | Kondou et al. | |

\* cited by examiner

| ARTICLE ARRIVAL SHELF ||||
|---|---|---|---|
| CONTAINER | ARTICLE | NUMBER | ARRIVAL TIME |
| 1 | A | 30 | 14:00 |
| 2 | B | 20 | 14:00 |
| 3 | C | 15 | 14:00 |
| 4 | D | 5 | 14:00 |

| PICKUP STATION ||||
|---|---|---|---|
| DELIVERY DESTINATION | ARTICLE | NUMBER | END TIME |
| X STORE | A<br>B<br>C | 20<br>10<br>5 | 15:00 |
| Y STORE | A<br>B<br>C | 10<br>10<br>5 | 15:00 |
| Z STORE | C<br>D | 5<br>5 | 15:00 |

AUTOMATIC ARTICLE CONVEYING SYSTEM AND AUTOMATIC ARTICLE CONVEYING METHOD

BACKGROUND OF THE INVENTION

1. Field of the Invention

The present invention relates to an automatic conveying technique for an article using an autonomous moving robot.

2. Description of the Related Art

In recent years, various robots have been introduced to improve productivity and solve labor shortage in factories and distribution warehouses. For example, vehicle assembly robots have been introduced in automobile factories, article picking robots have been introduced in distribution warehouses, and robots that guide visitors have also been introduced in shopping malls and event venues. The operation positions of these robots are fixed, and introduction of self-moving robots is being considered to further improve productivity.

U.S. Pat. No. 9,786,187 discloses an automatic vehicle control method relating to an article delivery system for e-commerce and the like. An automatic vehicle management system sets a movement route in consideration of a movement time, costs, safety, etc., and a plurality of automatic vehicles move to each other in their respective network areas to receive and deliver articles without human intervention.

JP-A-2020-21351 discloses a control method for efficiently performing movement between robots that move in different tasks. Each robot has a function of transmitting and receiving action information. The action information includes a current position information of a robot, task information about a task being executed, and a benefit function for the task. Each robot creates a route plan by selecting a combination that maximizes a mutual benefit based on a benefit when the robot selects a certain movement candidate point and a benefit when another robot selects a certain movement candidate point.

JP-A-2020-33154 discloses providing a combination detection unit that detects combination patterns including a plurality of different functional elements related to a picking operation and an evaluation unit that evaluates each detected combination pattern based on a predetermined evaluation standard, so as to realize an overall optimum picking operation.

JP-A-2020-1868 relates to a picking support system and discloses that sorting shelves selected from shelves are moved to operation places selected from a plurality of operation places, and articles are moved from storage shelves arranged in the selected operation places to the sorting shelves by picking operation, and such a predetermined series of processes is repeatedly performed while changing the operation places until the sorting shelves accommodate predetermined articles.

In U.S. Pat. No. 9,786,187, since a large number of automatic vehicles are controlled by the automatic vehicle management system, it takes time to formulate an operation plan. This problem becomes more apparent as the number of automatic vehicles handled increases and the types of articles handled increase. Further, there is a problem that it is difficult to promptly review the operation plan when some trouble occurs in a certain automatic vehicle.

In JP-A-2020-21351, since each robot creates a movement route for a given task by itself, the load on the management system is lighter than that in U.S. Pat. No. 9,786,187, but since each robot performs a different task, there is a problem that a task of a certain robot is stopped when some trouble occurs in the robot.

JP-A-2020-33154 and JP-A-2020-1868 have the same problems as U.S. Pat. No. 9,786,187.

SUMMARY OF THE INVENTION

The invention is made given the above-mentioned problems and has an object to provide an automatic conveying technique capable of reducing load on a management system and promptly formulating and reviewing an operation plan.

One preferred aspect of the invention includes: a plurality of conveying vehicles including a first conveying vehicle and a second conveying vehicle; and a management system configured to control the plurality of conveying vehicles. The management system is configured to formulate, for the plurality of conveying vehicles, an operation plan to be executed in a plurality of conveying operations collectively performed by the plurality of conveying vehicles. The management system is configured to determine by calculation that the first conveying vehicle is to perform a first conveying operation among the plurality of conveying operations, notify the other conveying vehicles including the second conveying vehicle of the first conveying operation, and cause the first conveying vehicle to perform the first conveying operation. The management system is configured to determine by calculation a second conveying operation to be performed by the second conveying vehicle among conveying operations that are not to be performed by the other conveying vehicles including the first conveying vehicle among the plurality of conveying operations, notify the other conveying vehicles of the second conveying operation, and cause the second conveying vehicle to perform the second conveying operation. The second conveying operation is calculated such that the plurality of conveying operations collectively performed by the plurality of conveying vehicles have a higher conveying efficiency.

Another preferred aspect of the invention is an automatic article conveying method of controlling a plurality of conveying vehicles including a first conveying vehicle and a second conveying vehicle by a management system including an operation plan formulation unit and a calculation unit. This method includes: a first step of the operation plan formulation unit formulating, for the plurality of conveying vehicles, an operation plan to be executed in a plurality of conveying operations collectively performed by the plurality of conveying vehicles, a second step of the calculation unit performing a first calculation for determining a first conveying operation to be performed by the first conveying vehicle among the plurality of conveying operations, a third step of the management system notifying the second conveying vehicle of the first conveying operation, and a fourth step of the calculation unit performing a second calculation for determining a second conveying operation to be performed by the second conveying vehicle among the plurality of conveying operations among operations other than the first conveying operation. The second calculation is a calculation of solving an optimization problem of minimizing or maximizing an objective function. The objective function has a penalty term for evaluating a degree of interference between the first conveying operation and the second conveying operation.

In a more specific example of the configuration of the invention, the calculation unit that performs the second calculation is a CMOS annealing machine mounted on the second conveying vehicle.

In another more specific example of the configuration of the invention, the penalty term is for evaluating at least one of a conveying vehicle congestion degree and a conveying vehicle route crossing probability.

It is possible to provide an automatic conveying technique capable of reducing load on a management system and promptly formulating and reviewing an operation plan. Other problems and novel features are obvious from the present specification and the accompanying drawings.

BRIEF DESCRIPTION OF THE DRAWINGS

FIG. 2 is a table showing an example of an operation plan of the automatic article conveying system according to the embodiment.

DESCRIPTION OF THE PREFERRED EMBODIMENTS

Figure 1:
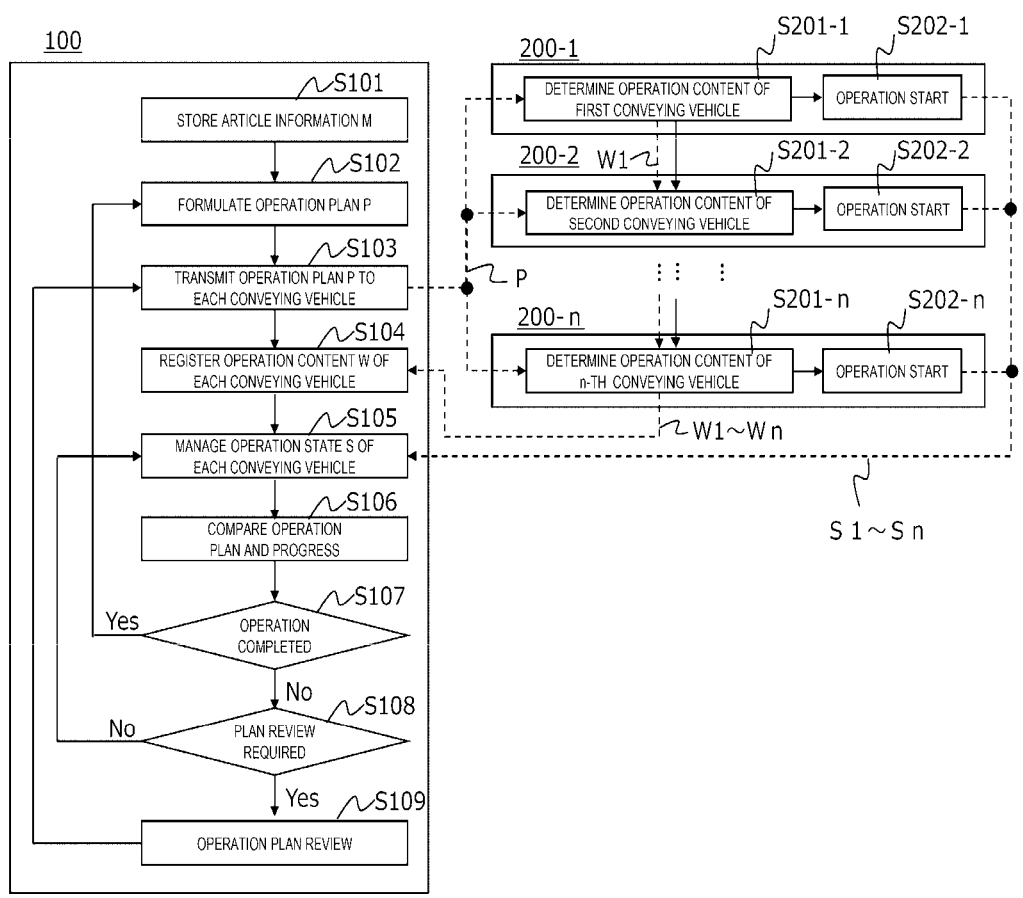
FIG. 1 is a processing flow diagram of an automatic article conveying system according to an embodiment.

Embodiments will be described in detail with reference to the drawings. However, the invention is not construed as being limited to the description of the embodiments shown below. Those skilled in the art could have easily understood that the specific configuration of the invention can be changed without departing from a spirit or a gist of the invention.

In configurations of the invention described below, the same reference numerals may be used in common among different drawings for the same parts or parts having similar functions, and duplicate descriptions may be omitted.

When there is a plurality of elements having the same or similar functions, the elements may be described by adding different indexes to the same reference numeral. However, when it is unnecessary to distinguish the plurality of elements, the elements may be described by omitting the indexes.

The terms "first", "second", "third", and the like in the present specification are used to identify constituent elements, and do not necessarily limit numbers, orders, or contents thereof. Further, the numbers for identifying the constituent elements are used for each context, and the numbers used in one context do not always indicate the same configuration in other contexts. Further, it does not prevent the constituent element identified by a certain number from having the function of a constituent element identified by another number.

To facilitate understanding of the invention, a position, a size, a shape, a range, etc. of each constituent element shown in the drawings may not represent an actual position, size, shape, range, etc. Therefore, the invention is not necessarily limited to the position, size, shape, range, etc. disclosed in the drawings.

All publications, patents, and patent applications cited in the present specification form part of the present specification as they are.

Constituent elements represented in a singular form in the present specification shall include a plural form unless explicitly indicated in the context.

In the present embodiment, an automatic article conveying system instructs a plurality of conveying vehicles controlled to convey articles an operation plan, and each conveying vehicle determines an operation content of the current vehicle. The operation plan is realized by executing the operation contents of the plurality of conveying vehicles.

In one example of an embodiment, an automatic article conveying system includes a plurality of conveying vehicles including a first conveying vehicle and a second conveying vehicle, and a management system that controls the plurality of conveying vehicles. The management system formulates, for the plurality of conveying vehicles, an operation plan for a plurality of conveying operations to be collectively performed by the plurality of conveying vehicles. The first conveying vehicle determines by calculation to perform a first conveying operation among a plurality of conveying operation plans, and notifies the other conveying vehicles including the second conveying vehicle of an operation state of the first conveying operation so as to perform the first conveying operation. The second conveying vehicle determines by calculation a second conveying operation to be performed by the second conveying vehicle among operations that are not performed by the other conveying vehicles including the first conveying vehicles among the plurality of conveying operation plans, and notifies the other conveying vehicles of an operation state of the second conveying operation so as to perform the second conveying operation. The calculation of the second conveying operation to be performed by the second conveying vehicle is performed such that the conveying operations collectively performed by the plurality of conveying vehicles have a higher conveying efficiency.

Furthermore, the management system has a function of collecting operation states of the plurality of conveying vehicles, and reviews a plan for the plurality of conveying operations according to the operation states. The plurality of conveying vehicles update the respective conveying operations thereof based on the reviewed plan.

Embodiment 1

1. Processing Flow of Automatic Article Conveying System

FIG. 1 is a processing flow of an automatic article conveying system according to Embodiment 1 of the invention. FIG. 1 shows a processing flow of a management system 100 and a plurality of (n) conveying vehicles 200-1 to 200-n, and a data flow between the management system 100 and the plurality of conveying vehicles 200. The processing flow is shown by a solid line, and the data flow is shown by a dotted line.

First, article information M is stored in a memory in step S101. It is assumed that the article information M is received from a higher-level device of the management system 100 or is separately input by a user. Specific examples of the article information M include data of an article arriving from a previous process, data of an article to be sent to a subsequent process, and progress of other processes as needed.

An example of the data of an article arriving from a previous process is warehousing information. The warehousing information is, for example, information on when and which product arrives at which article shelf. An example of the data of an article to be sent to a subsequent process is order information from customers. The order information from customers is, for example, information on when and which product is to be shipped to which customer (or to be moved to which shipping location). Products, article shelves, customers, and shipping locations can be identified, for example, by an ID. The progress of other processes is, for example, maintenance information of a conveying vehicle, shift information of an operator, and the like. An operation plan is formulated based on such information.

Next, an operation plan P is formulated in step S102 based on the article information M, and the operation plan P is transmitted to each conveying vehicle 200 in step S103. The operation plan P is, for example, in the case of the present embodiment, information indicating when, where, and which product is to be moved with respect to products included in the article information. When the operation plan P is generated from the article information M, the user may manually create the operation plan P, but if the operation plan P can be automatically generated, operation efficiency can be increased. JP-A-2020-1868 is an example of generating an operation plan P from article information M.

In FIG. 1, the operation plan P is transmitted in parallel to each conveying vehicle 200, but may also be transmitted in series by a relay method as long as the operation plan P can be received before calculation of an operation content W. A communication means between the management system 100 and each conveying vehicle 200 for transmitting the operation plan P to each conveying vehicle 200 is not particularly limited, and it is conceivable to adopt a general wireless communication method (the same applies hereinafter).

In the plurality of conveying vehicles 200, first, in step S201-1, a first conveying vehicle 200-1 determines an operation content W1 of the current vehicle by calculation, transmits the operation content W1 to another conveying vehicle 200 and the management system 100, and performs an operation in step S202-1. The operation content W is, for example, in the case of the present embodiment, information indicating when, where, and how the current vehicle moves which product among the products included in the article information in order to execute the operation plan P. Information indicating how to move a product is, for example, information indicating a route taken by a conveying vehicle.

In FIG. 1, the operation content W1 of the first conveying vehicle 200-1 is transmitted from the first conveying vehicle 200-1 to an n-th conveying vehicle 200-n by a relay method, and finally, operation contents W1 to Wn are collectively transmitted from the n-th conveying vehicle 200-n to the management system 100. However, transmission may also be performed in parallel from the first conveying vehicle 200-1 to a second conveying vehicle 200-2 to the n-th conveying vehicle 200-n, and to the management system 100. The transmission method is not limited as long as each conveying vehicle 200 can receive the operation content W of other conveying vehicles before calculation of the operation content of the current vehicle.

Then, in step S201-2, the second conveying vehicle 200-2 determines by calculation an operation content W2 to be performed by the second conveying vehicle among operations that the other conveying vehicles including the first conveying vehicle 200-1 are not performing among the operation plans, transmits the operation content W2 to the other conveying vehicles 200 and the management system 100, and performs an operation in step S202-2.

The same process is repeated thereafter, and in step S201-n, the n-th conveying vehicle 200-n determines an operation content Wn by calculation, transmits the operation content Wn thereof to the management system 100, and performs an operation in step S202-n. Further, the conveying vehicles 200-1 to 200-n constantly transmit operation states S1 to Sn to the management system 100.

The operation contents W1 to Wn sent from the conveying vehicles 200-1 to 200-n are stored in the management system 100 in step S104. The operation states S1 to Sn constantly sent from the conveying vehicles 200-1 to 200-n are stored in the management system 100 in step S105, so that the operation states of the conveying vehicles are managed. In step S106, the operation plan formulated in step S102 and the operation states managed in step S105 are compared to determine whether the planned operations are completed or not in step S107.

Here, an operation state S is data indicating, with variables a state of an operation performed by each resource to execute an operation plan P.

If the planned operations are completed, a next operation plan is formulated in step S102, and if the planned operations are not completed, it is determined in step S108 whether the operation plan needs to be reviewed or not. If it is unnecessary to review the operation plan, the processing returns to operation progress management in step S105, and if it is necessary to review the operation plan, the operation plan is reviewed in step S109 and the reviewed operation plan is transmitted to each conveying vehicle in step S103.

In the plurality of conveying vehicles 200, each conveying vehicle determines and executes a respective operation content thereof by calculation in the same flow as described above based on the reviewed operation plan.

In the present embodiment, the operation content W is data indicating, with variables, the operation for each resource (in this case, conveying vehicle 200) to execute the operation plan P. The operation content W can represent, for example, articles to be handled by each conveying vehicle, an operation start time, an operation end time, and a conveying route (including a departure point and a destination) as variables. An example of an operation content is described in JP-A-2020-1868, etc. Various combinations of operation contents can be taken, and an efficient operation content can be obtained as a solution to an optimization problem of searching for a solution that maximizes or minimizes an objective function under a predetermined constraint condition. A common method to solve an optimization problem is to calculate by using a computer having a von Neumann architecture. Meanwhile, as a technique capable of solving an optimization problem in recent years, JP-A-2016-051314 discloses a semiconductor device in which components that are basic building blocks are arranged in an array to obtain a ground state of an Ising model is used for pseudo expression of a state of a quantum spin.

In the present embodiment, by mounting the semiconductor device as described above on each conveying vehicle 200, each conveying vehicle executes determination of operation content of the current vehicle (S201). However, the configuration for calculating the operation content does not necessarily have to be provided inside each of the conveying vehicles 200, and may be provided inside the management system 100.

In the present embodiment, the operation content W of the current vehicle is sequentially determined in the order of the first conveying vehicle 200-1 to the n-th conveying vehicle 200-n. The order of the conveying vehicles may be any order, for example, the order of conveying vehicle ID. An x-th conveying vehicle (1<x<n) determines an operation content of the current vehicle from an operation range other than determined operation contents including operation contents of the operation content W1 of the first conveying vehicle 200-1 to an operation content Wx−1 of an (x−1)th conveying vehicle 200-(x−1).

2. Operation Plan and Operation Content

Next, the operation content of each of the conveying vehicles 200 will be described with reference to FIGS. 2 and 3 by taking a distribution warehouse as an example. FIG. 2 shows an example of the operation plan formulated in step 102.

The left side of FIG. 2 shows article arrival shelf data and shows IDs of containers arriving at an article arrival shelf, names or IDs of articles stored in the containers, numbers of the articles, and arrival times to the arrival shelf.

The right side of FIG. 2 shows pickup station data and shows names or IDs of delivery destinations from a pickup station, names or IDs of articles to be delivered to the delivery destination, numbers of the articles, and delivery preparation end times. The delivery preparation end time is an end limit time of the operation content because preparation must be completed by this time.

Here, a specific operation plan is to move the articles shown in the article arrival shelf data to operation areas corresponding to the delivery destinations shown in the pickup station data by predetermined types and predetermined numbers by the end limit time.

Figure 3:
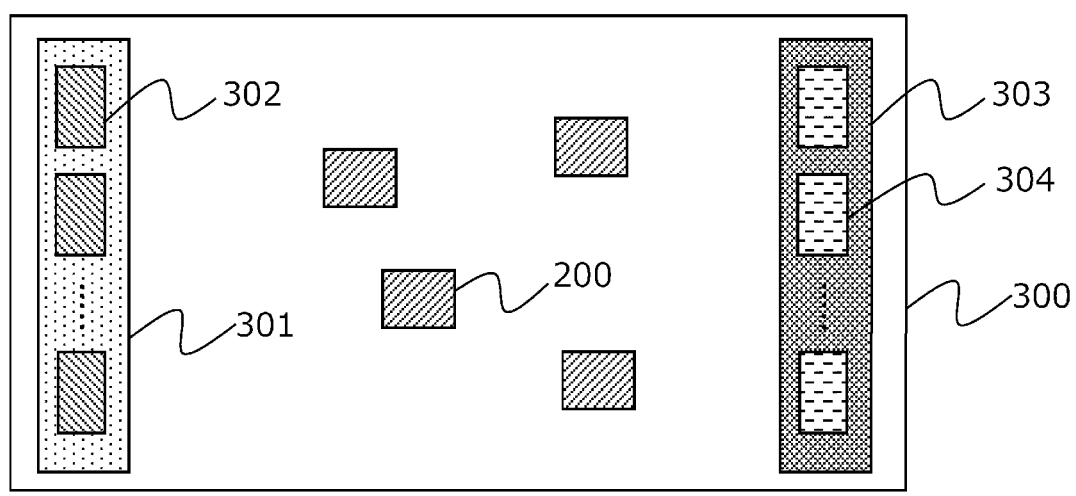
FIG. 3 is a plan view of a conveying vehicle operation area of the automatic article conveying system according to the embodiment.

FIG. 3 shows a plan view of a conveying vehicle active area including the article arrival shelf and the pickup station shown in FIG. 2.

Each of the conveying vehicles 200 receives a container 302 containing a plurality of articles from an article arrival shelf 301 and conveys the container 302 to a pickup station 303. At the pickup station 303, an operator picks up a required number of articles for each delivery destination in an operation area 304 of the delivery destination. The same operation is repeated for the other articles, and articles required for each delivery destination are sorted. These operations are determined according to the operation plan P.

3. Conveying Vehicle Operation Content Determination

A method for determining the operation content of each of the conveying vehicles 200 will be described. Based on the operation plan of FIG. 2, the first conveying vehicle 200-1 first determines the operation content W1. In this case, if the other conveying vehicles are not working, the operation content may be randomly selected, or may be selected from operation contents having a long moving distance. It is considered that in a situation where the other conveying vehicles are not working, congestion and crossing are less likely to occur and an operation efficiency can be improved by starting from an operation that is complicated and has a long moving distance.

Here, it is assumed that the first conveying vehicle 200-1 selects an operation of conveying an article A to respective operation areas for an X store and a Y store in order. Next, when the second conveying vehicle 200-2 determines the operation content W2, the operation content is determined by calculation from a moving distance, a pickup station congestion degree, a crossing probability with the other conveying vehicles, an end limit time, and the like. Here, it is possible to select an operation of conveying an article B to the operation areas for the X store and the Y store, but if the article B is conveyed for the X store and the Y store in order in the same manner as the first conveying vehicle 200-1, there is a possibility of waiting for the first conveying vehicle to complete its operation at the pickup station, and thus, a conveying route of conveying for the Y store and the X store in order is selected, and the operation content is determined to improve the overall conveying efficiency.

Similar to the second conveying vehicle 200-2, the operation content of a third conveying vehicle 200-3 is determined by calculation from a moving distance, a pickup station congestion degree, a crossing probability with other conveying vehicles, an end limit time, and the like. At this time, since the operation of conveying an article C to operation areas for the X store, the Y store, and a Z store may cause conveying vehicle congestion at the pickup station, the operation is determined to be an operation of conveying an article D to an operation area for the Z store.

In this way, the overall optimization can be performed by the conveying vehicles performing a calculation such that the efficiency of the entire conveying operation is improved. In addition, an optimization calculation when determining the operation content can use an annealing-type computer such as a complementary metal oxide semiconductor (CMOS) annealing machine using an interaction model, or software for solving optimization problems implemented in software on a central processing unit (CPU) or a graphics processing unit (GPU).

According to the automatic article conveying system of Embodiment 1, the management system 100 formulates the operation plan to be performed by the plurality of conveying vehicles 200, and each conveying vehicle determines the operation content thereof by calculation based on the operation plan, so that load on the management system 100 can be reduced. Further, the management system 100 constantly monitors operation progress of the plurality of conveying vehicles 200, and can also review the operation plan as needed. Since each conveying vehicle determines the own operation content thereof by calculation based on the reviewed operation plan, it is possible to promptly formulate and review the operation plan and reflect the operation plan in the operation content.

4. Management System 100 Configuration Example

Figure 4:
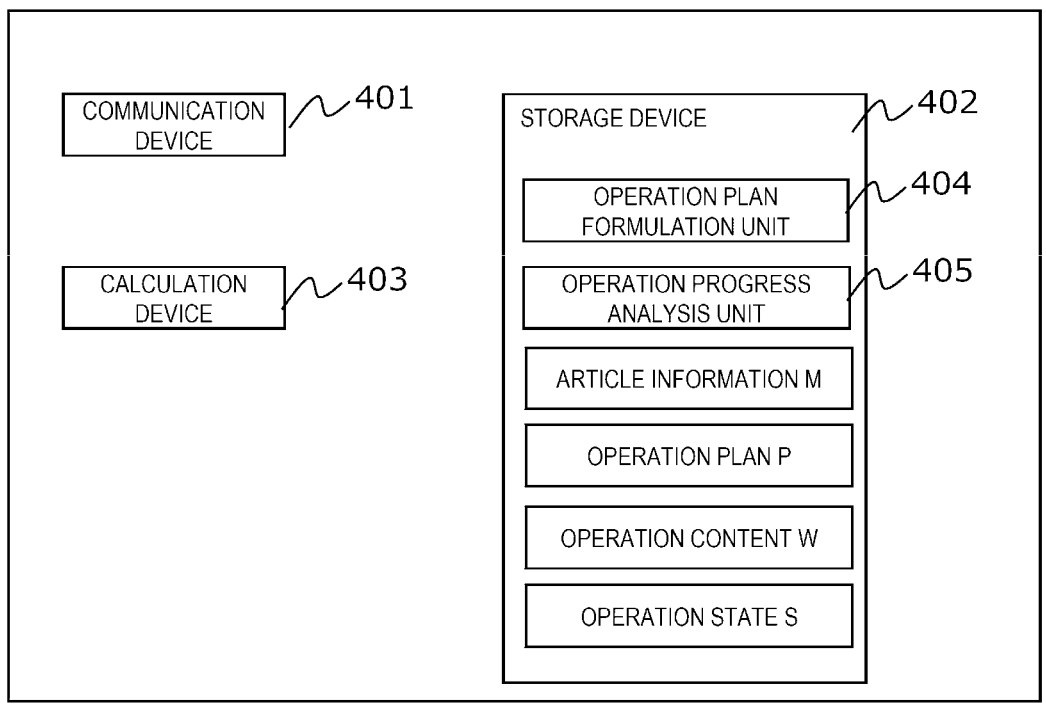
FIG. 4 is a block diagram showing a configuration of a management system according to the embodiment.
Figure 5:
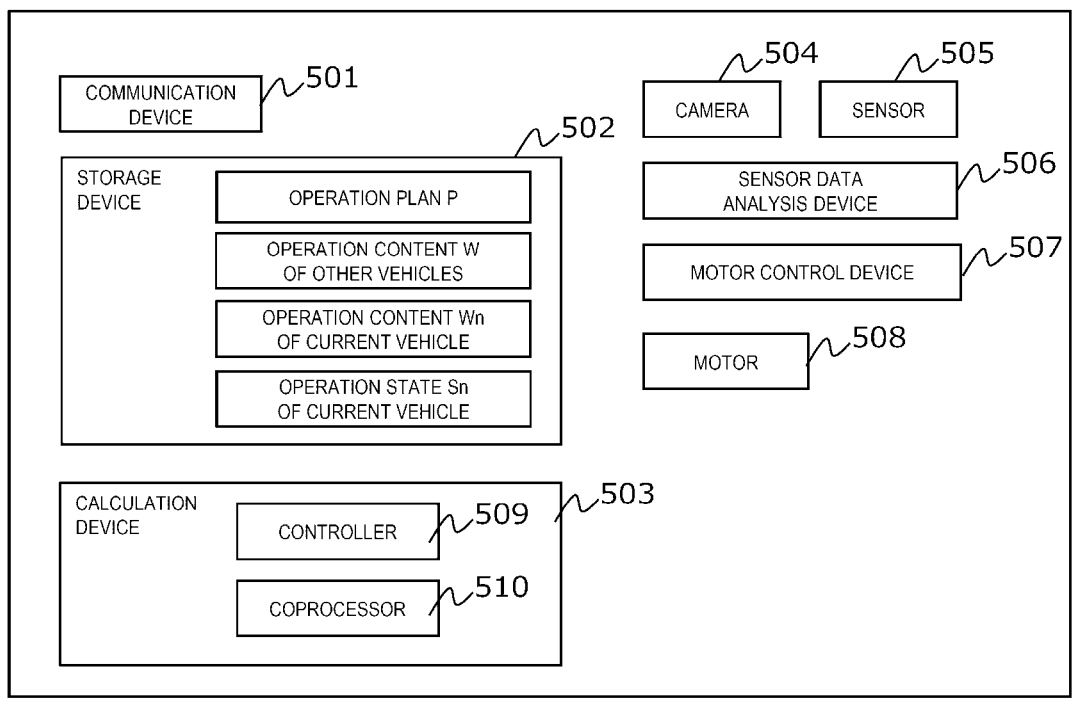
FIG. 5 is a block diagram showing a configuration of a conveying vehicle according to the embodiment.

FIGS. 4 and 5 are configuration examples of the management system 100 and the conveying vehicle 200 of the invention.

In FIG. 4, the management system 100 includes a communication device 401, a storage device 402, a calculation device 403, an operation plan formulation unit 404, and an operation progress analysis unit 405. The management system 100 is assumed to include an information processing device such as a general server. Configurations normally provided by a server, for example, an input device such as a keyboard and an input device such as an image monitor, are omitted.

In the present embodiment, functions such as calculation and control can realize a specified process in cooperation with other hardware by executing a program stored in the storage device 402 by the calculation device 403. A program executed by a computer or the like, a function thereof, or a means that realizes the function may be referred to as a "function", a "means", a "unit", a "device", or the like.

In the present embodiment, a function equivalent to a function configured by software can be realized by hardware such as a field programmable gate array (FPGA) and an application specific integrated circuit (ASIC). In FIG. 4, the operation plan formulation unit 404 and the operation progress analysis unit 405 are shown as software stored in the storage device 402, whereas it is also possible to implement the same functions by hardware as described above.

The communication device 401 receives the article information M from a host system or an input device, transmits the operation plan P to each conveying vehicle 200, receives the operation content W and the operation state S of each conveying vehicle, and the like. The storage device 402 stores information such as the article information M, the operation plan P, the operation content W, and the operation state S. Further, the storage device 402 stores the operation plan formulation unit 404 and the operation progress analysis unit 405, which are programs executed by the calculation device 403.

The calculation device 403 executes processes of the operation plan formulation unit 404 and the operation progress analysis unit 405. The operation plan formulation unit 404 and the operation progress analysis unit 405 formulate the operation plan P and analyze the operation state S, respectively.

5. Configuration Example and Operation Example of Conveying Vehicle 200-$n$

FIG. 5 is a block diagram showing a configuration example of the n-th conveying vehicle. In FIG. 5, the conveying vehicle 200-$n$ includes a communication device 501, a storage device 502, a calculation device 503, a camera 504, a sensor 505, a sensor data analysis device 506, a motor control device 507, and a motor 508.

The communication device 501 receives the operation plan P from the management system 100, receives the operation content W from another conveying vehicle 200, transmits the operation content Wn to the management system 100 and another conveying vehicle 200, and transmits an operation state Sn to the management system 100.

The storage device 502 stores information such as the operation plan P, the operation content W of the other conveying vehicles, the operation content Wn and the operation state Sn of the current vehicle, and the like. The calculation device 503 performs an optimization calculation for determining the operation content Wn of the current vehicle. The calculation device 503 can adopt a technique for obtaining a ground state of an Ising model by using, for example, an annealing-type computer such as a CMOS annealing machine described in JP-A-2016-051314. In the present embodiment, the calculation device 503 includes a controller configured with an FPGA or the like and a coprocessor 510 which is hardware for solving an optimization problem to which the technique described in JP-A-2016-051314 is applied. However, the calculation device can also be implemented in software.

The camera 504 and the sensor 505 collect data necessary for grasping positions of the article arrival shelf 301, the pickup station 303, etc., grasping distances from the other conveying vehicles, and grasping states thereof, and the sensor data analysis device 506 analyzes the data. Based on an analysis result of sensor data, the motor control device 507 controls the motor 508, and the conveying vehicle 200 executes the operation content Wn of the current vehicle. Further, the grasped state of the current vehicle is stored in the storage device 502 as the operation state Sn of the current vehicle and is transmitted to the management system 100 by the communication device 501.

According to the automatic article conveying system of the present embodiment, since the conveying vehicle 200 includes the camera 504 and the sensor 505, the positions of the article arrival shelf 301, the pickup station 303, and the like and the distances from the other conveying vehicles can be grasped, and autonomous moving is possible.

Figure 6:
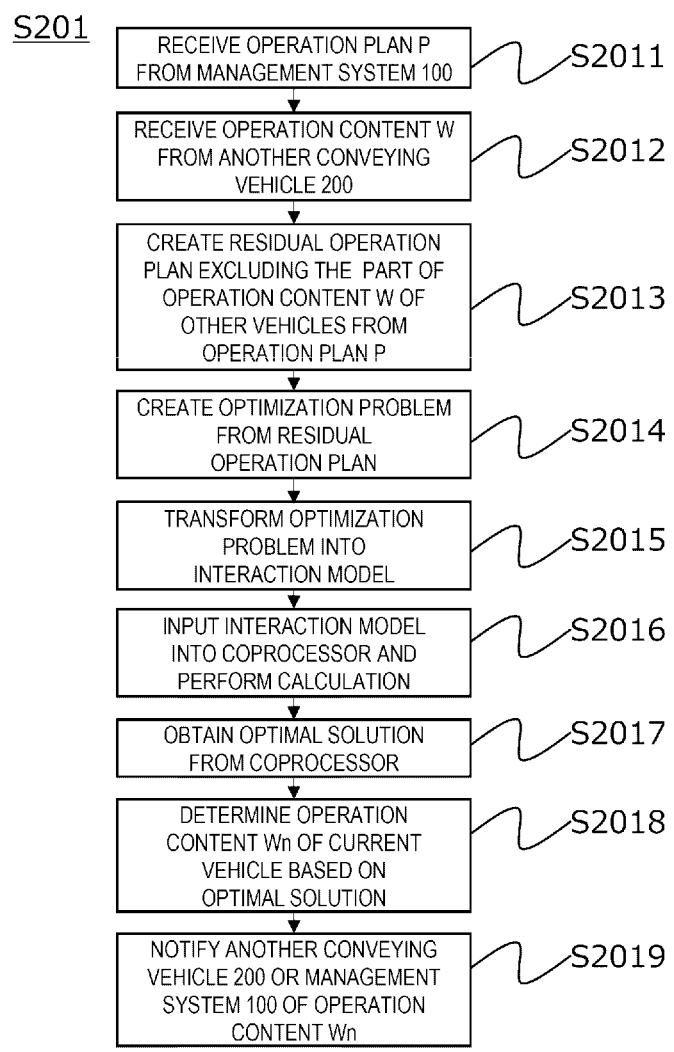
FIG. 6 is a flow diagram showing an example of processing to be performed by a calculation device of a conveying vehicle.

FIG. 6 is a flow chart showing an example of an operation content determination process S201 performed by the calculation device 503 of the conveying vehicle 200.

In step S2011, the controller 509 of the calculation device 503 receives an operation plan P from the management system 100 via the communication device 501. The operation plan P is stored in the storage device 502.

In step S2012, the controller 509 receives the operation content W from another conveying vehicle 200. The operation content W is stored in the storage device 502.

In step S2013, the controller 509 creates a residual operation plan excluding the part of the operation content W of the other conveying vehicles from the operation plan P. The operation content Wn to be executed by the current vehicle is to execute a part or all of the residual operation plan.

In step S2014, the controller 509 creates an optimization problem from the residual operation plan. The optimization problem can be automatically generated according to a predetermined rule. The predetermined rule can be any rule based on well-known techniques. In general, an optimization problem is a problem of maximizing or minimizing a given function (objective function) under given conditions (constraint conditions). Here, for example, variables of the objective function are luggage carried by a conveying vehicle, a conveying route, a departure time, and an arrival time. The constraint conditions are a conveying vehicle operation time, a pickup station congestion degree, route crossing with another conveying vehicle, an operation end time limit, physical constraints (for example, the same luggage is not carried on multiple conveying vehicles), and the like.

The objective function is given, for example, as follows.

Objective function=(conveying vehicle operation time)+(pickup station congestion degree)+(crossing probability of routes with other conveying vehicles)+(other constraints)

By defining the objective function as described above and obtaining a solution that minimizes the objective function, it is possible to obtain a solution (operation content) in consideration of the overall operation efficiency including the other conveying vehicles. Each constraint can be given any weight. Although the (conveying vehicle operation time) is preferably short, the restriction of other constraints must be taken into consideration at the same time. Since a limit time ("end time" in FIG. 2) needs to be adhered to, if the operation time exceeds the limit time, the weight will be infinite, for example. Reducing the (pickup station congestion degree) and the (crossing probability of routes with other conveying vehicles) means to reduce interference with other vehicles and improving the overall operation efficiency.

In the optimization problem, the operation content Wn of the current vehicle can be determined by obtaining a solution that minimizes the objective function. The generation of the optimization problem is not particularly limited and may follow well-known techniques.

Based on constraint conditions such as the operation time, the pickup station congestion degree, and the crossing probability with the other conveying vehicles when extracting the operation content candidates from the residual operation plan and selecting the operations, the operations are determined such that the objective function is minimized within the end limit time. The pickup station congestion degree and the crossing probability with the other conveying vehicles can be calculated by estimating whether or not a plurality of conveying vehicles are in a close area in the same time zone from the operation plans of the other conveying vehicles and the operation plan of the current vehicle that have been decided.

In the present embodiment, costs incurred due to affecting the operation contents of the other conveying vehicles, or costs incurred due to being affected by the operation contents of the other conveying vehicles, such as the pickup station congestion degree and the crossing probability with other conveying vehicles are constraints (penalty terms). For example, an operation that increases the pickup station congestion degree or causes crossing with the other conveying vehicles should be avoided as much as possible because interference will reduce the operation efficiency of the other vehicles, and as long as within range of the end limit time, an operation having a low pickup station congestion degree and a low crossing probability is selected even if the moving distance is long. In this way, not only the operation efficiency of the conveying vehicle but also the operation efficiency of other conveying vehicles can be considered.

In the present embodiment, the above-mentioned optimization problem is solved by the coprocessor 510 using an interaction model.

In step S2015, the controller 509 transforms the optimization problem into an interaction model for the coprocessor to handle the optimization problem. In the interaction model, for example, calculation can be performed by using the above-mentioned variables as nodes, and using coefficients defining constraints (constraint functions) as interaction between the nodes.

In step S2016, the controller 509 inputs the interaction model into the coprocessor 510 and performs calculation.

In step 52017, the controller 509 reads the optimal solution from the coprocessor 510.

In step S2018, based on the optimal solution, the controller 509 determines the operation content Wn of the current vehicle by reversely transforming the interaction model.

In step S2019, the controller 509 notifies another conveying vehicle 200 or the management system 100 of the determined operation content Wn.

The processes of steps S2014 to S2018 may follow the technique disclosed in, for example, JP-A-2016-051314.

In the present embodiment, the management system 100 only generates and instructs the overall operation plan P, and the operation of each conveying vehicle 200 is entrusted to each calculation device 503. Therefore, it is unnecessary to control each conveying vehicle 200 on the management system 100 side, and as a result, it is possible to improve the overall efficiency. Further, since each conveying vehicle 200 can optimize its own operation content based only on the overall operation plan P and the operation content W of the other conveying vehicles, it is possible to perform control without integrated processing of overall information such as synchronization guarantee and consistency guarantee. Therefore, the operation is robust and the plan can be easily changed.

Embodiment 2

The processing flow of a management system and conveying vehicles according to the present embodiment is the same as that in FIG. 1. Further, the configuration diagram of the conveying vehicles according to the present embodiment is the same as that in FIG. 5. In the present embodiment, the flow when some trouble occurs in the conveying vehicles 200 during operation will be described.

Troubles that occur in the conveying vehicles 200 can be detected by the sensor 505 and the sensor data analysis device 506 incorporated in each conveying vehicle 200. For example, troubles of a motor can be detected by installing a vibration sensor on the motor. The detected information is transmitted to the management system 100 together with the operation states of the conveying vehicles. In step S105, troubles of the conveying vehicles are recognized by the management system, delay to the plan is calculated in step S106, and the operation plan is reviewed in step 109.

Next, a process will be described when the operation state S is not sent to the management system 100 due to a trouble in a power supply system of each conveying vehicle 200. As described in Embodiment 1, since the plurality of conveying vehicles 200 transmit the operation state S to the management system 100 at any time, when the operation state S from a certain conveying vehicle is not received, the management system 100 can detect the abnormality. Based on the detection information, the operator confirms the situation at the site.

According to the automatic article conveying system of the present embodiment, since the management system can detect the trouble even when some trouble occurs in a certain conveying vehicle, the operation plan can be reviewed so that the operation is not stopped. Further, since each conveying vehicle updates the operation content based on the reviewed operation plan, it is possible to provide an automatic conveying system that promptly responds to trouble.

Embodiment 3

Figure 7:
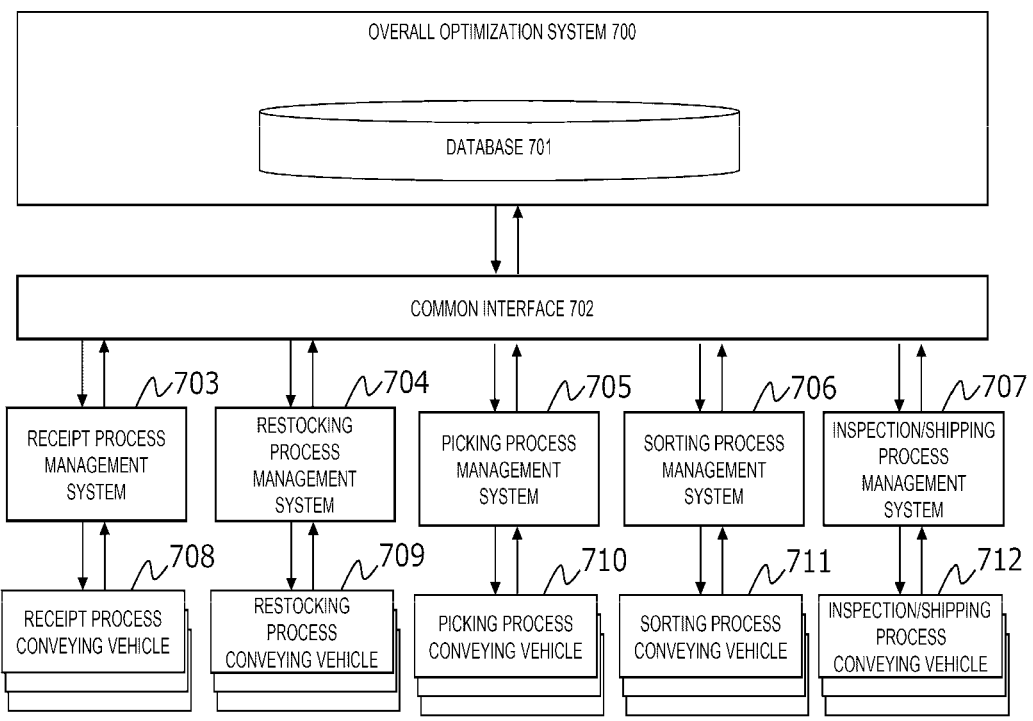
FIG. 7 is a block diagram showing an application example of the automatic article conveying system according to the embodiment to an entire distribution warehouse.

FIG. 7 shows an application example of the automatic article conveying system according to the present embodiment to an entire distribution warehouse. The distribution warehouse has processes such as receipt, restocking, picking, sorting, and inspection/shipping, and it is possible to introduce the automatic article conveying system of the invention into the processes. Each process is managed by an overall optimization system 700, and a type and an arrival time of an article, a delivery destination, a scheduled shipping time, and the like are transmitted to management systems 703 to 707 of the processes. Operation progress of each process is transmitted from the management systems 703 to 707 of the processes to the overall optimization system 700 via a common interface 702.

According to the automatic article conveying system of the present embodiment, since the overall optimization system 700 can manage the operation progress of each process, it is possible to optimize the entire distribution warehouse and provide a highly productive distribution warehouse.

Modification

The invention is not limited to the above-mentioned embodiments, and includes various modifications. For example, in the automatic article conveying system of the present Embodiments 1 to 3, the conveying vehicle may be a flying object such as a drone. By using a drone, conveyance to remote areas is possible.

In the automatic article conveying system of the present Embodiments 1 and 2, in the operation completion determination in step S107, even the operation is not entirely completed, the next operation plan may be formulated when the operation is predicted to be completed. A waiting time of the conveying vehicles can be reduced, and productivity can be further improved. Further, position information of the conveying vehicles may be transmitted together with the operation states transmitted from the conveying vehicles to the management system. Since the management system can grasp the operation states in more detail, the prediction of operation completion can be predicted more accurately. The management system may specify the order of the conveying vehicles that determine the operation content by calculation. Productivity can be further improved by utilizing the above-mentioned position information of each conveying vehicle.

According to the above-mentioned embodiments, by determining an operation to be performed by each conveying vehicle by calculation, it is possible to provide an automatic conveying system that reduces load on a management system and promptly formulates and reviews an operation plan and reflects the operation plan in operation contents. Furthermore, by collecting an operation state of each conveying vehicle by the management system, it is possible to provide an automatic conveying system that promptly responds to troubles by reviewing the operation plan so that the operation is not stopped even when some trouble occurs in a certain conveying vehicle.

What is claimed is:

1. An automatic article conveying system comprising:
   a plurality of conveying vehicles including a first conveying vehicle and a second conveying vehicle; and
   a management system configured to control the plurality of conveying vehicles, wherein
   the management system is configured to formulate, for the plurality of conveying vehicles, an operation plan to be executed in a plurality of conveying operations collectively performed by the plurality of conveying vehicles,
   the management system is configured to determine by calculation that the first conveying vehicle is to perform a first conveying operation among the plurality of conveying operations, notify the other conveying vehicles including the second conveying vehicle of the first conveying operation, and cause the first conveying vehicle to perform the first conveying operation,
   the management system is configured to determine by calculation a second conveying operation to be performed by the second conveying vehicle among conveying operations that are not to be performed by the other conveying vehicles including the first conveying vehicle among the plurality of conveying operations, notify the other conveying vehicles of the second conveying operation, and cause the second conveying vehicle to perform the second conveying operation, and
   the second conveying operation is calculated such that the plurality of conveying operations collectively performed by the plurality of conveying vehicles have a higher conveying efficiency.

2. The automatic article conveying system according to claim 1, wherein
   each of the plurality of conveying vehicles includes, as a part of the management system, a calculation device configured to calculate a conveying operation to be performed by the conveying vehicle by using an interaction model based on management information regarding at least one of a plurality of articles to be conveyed and conveying destinations, and conveying operation contents of the other conveying vehicles, and is configured to use the calculation device to calculate at least one of the first conveying operation and the second conveying operation.

3. The automatic article conveying system according to claim 2, wherein
   the calculation device is configured to, in order to determine a conveying operation to be performed by the conveying vehicle from among conveying operations that are not notified to be performed by the other conveying vehicles, perform an optimization calculation having a plan of the conveying operation to be performed by the conveying vehicle as a variable, an operation efficiency to be maximized or minimized as an objective function, and costs incurred due to affecting conveying operations of the other conveying vehicles or costs incurred due to being affected by the conveying operations of the other conveying vehicles as a penalty term.

4. The automatic article conveying system according to claim 3, wherein
   the optimization calculation has at least one of a conveying vehicle congestion degree and a conveying vehicle route crossing probability as the penalty term.

5. The automatic article conveying system according to claim 3, wherein
   the calculation device is an annealing-type computer.

6. The automatic article conveying system according to claim 3, wherein
   the calculation device is a CPU or GPU on which software for solving an optimization problem is mounted.

7. The automatic article conveying system according to claim 2, wherein
   the management system has a function of collecting operation states of the plurality of conveying vehicles, and is configured to review the plan for the plurality of conveying operations according to the operation states, and
   the plurality of conveying vehicles are configured to update the respective conveying operations thereof based on the reviewed plan.

8. An automatic article conveying method of controlling a plurality of conveying vehicles including a first conveying vehicle and a second conveying vehicle by a management system including an operation plan formulation unit and a calculation unit, the automatic article conveying method comprising:
   a first step of the operation plan formulation unit formulating, for the plurality of conveying vehicles, an operation plan to be executed in a plurality of conveying operations collectively performed by the plurality of conveying vehicles,
   a second step of the calculation unit performing a first calculation for determining a first conveying operation to be performed by the first conveying vehicle among the plurality of conveying operations,
   a third step of the management system notifying the second conveying vehicle of the first conveying operation, and
   a fourth step of the calculation unit performing a second calculation for determining a second conveying operation to be performed by the second conveying vehicle among the plurality of conveying operations among operations other than the first conveying operation, wherein
   the second calculation is a calculation of solving an optimization problem of minimizing or maximizing an objective function, and
   the objective function has a penalty term for evaluating a degree of interference between the first conveying operation and the second conveying operation.

9. The automatic article conveying method according to claim 8, wherein
   the calculation unit that performs the second calculation is a CMOS annealing machine mounted on the second conveying vehicle.

10. The automatic article conveying method according to claim 8, wherein the penalty term is for evaluating at least one of a conveying vehicle congestion degree and a conveying vehicle route crossing probability.

\* \* \* \* \*